United States Patent
Schulz

(10) Patent No.: US 12,407,273 B2
(45) Date of Patent: Sep. 2, 2025

(54) SOLID-STATE AUTOTRANSFORMER

(71) Applicant: Rivian IP Holdings, LLC, Irvine, CA (US)

(72) Inventor: Steven Schulz, Torrance, CA (US)

(73) Assignee: Rivian IP Holdings, LLC

( * ) Notice: Subject to any disclaimer, the term of this patent is extended or adjusted under 35 U.S.C. 154(b) by 0 days.

(21) Appl. No.: 18/535,205

(22) Filed: Dec. 11, 2023

(65) Prior Publication Data

US 2025/0192695 A1  Jun. 12, 2025

(51) Int. Cl.
| | |
|---|---|
| H02M 7/537 | (2006.01) |
| B60L 15/00 | (2006.01) |
| H02M 1/088 | (2006.01) |
| H02M 1/44 | (2007.01) |

(52) U.S. Cl.
CPC .......... *H02M 7/537* (2013.01); *H02M 1/088* (2013.01); *H02M 1/44* (2013.01); *B60L 15/007* (2013.01)

(58) Field of Classification Search
CPC ........ H02M 7/537; H02M 1/088; H02M 1/44; B60L 15/007
See application file for complete search history.

(56) References Cited

U.S. PATENT DOCUMENTS

| | | | | |
|---|---|---|---|---|
| 5,942,884 | A | * 8/1999 | Soar | H02M 5/225 363/101 |
| 2015/0380967 | A1 | * 12/2015 | Toya | H02J 7/0068 320/128 |
| 2017/0106764 | A1 | * 4/2017 | Beaston | B60L 58/12 |
| 2019/0252918 | A1 | 8/2019 | Chen et al. | |
| 2021/0408938 | A1 | * 12/2021 | Feng | H02J 3/38 |
| 2022/0209587 | A1 | * 6/2022 | Kavimandan | H02J 50/10 |
| 2024/0039397 | A1 | * 2/2024 | Narayanasamy | H02M 7/5395 |

\* cited by examiner

*Primary Examiner* — Metasebia T Retebo
(74) *Attorney, Agent, or Firm* — FOLEY & LARDNER LLP

(57) ABSTRACT

Solid-state autotransformers are provided. A system can include a first switch coupled to a first line in which an alternating current signal is conveyed. The system can include a second switch coupled to a second line in which the alternating current signal is conveyed. The second switch can be coupled to the first switch. The first switch can, responsive to a magnitude of a first voltage from the first line to a terminal exceeding a magnitude of a second voltage from the second line to the terminal, pass current from the first line to the terminal. The second switch can, responsive to the magnitude of the second voltage exceeding the magnitude of the first voltage, pass current from the second line to the terminal.

13 Claims, 8 Drawing Sheets

300

SOLID-STATE AUTOTRANSFORMER

INTRODUCTION

A split-phase power system can include a neutral line. The neutral line can convey currents between unbalanced loads.

SUMMARY

A circuit can electrically couple a single-phase power source to a split-phase power sink. The circuit can provide a neutral line configured to source or sink current to balance a current draw between the legs of the split-phase power sink. For example, the circuit can include a terminal separating a first switch from a second switch. The first and second switch can actuate to pass current between the first line or the second line and the terminal. A filter can separate the terminal from a neutral line. For example, the filter can include an inductive element to smooth currents switched by the first and second switch. An operating frequency of the switches can exceed a line current. For example, the single-phase power source can be a mains frequency (e.g., 50 Hz or 60 Hz), wherein the first and second switches can actuate in the kHz range.

At least one aspect is directed to a system. The system can include a first switch coupled to a first line in which an alternating current signal is conveyed. The system can include a second switch coupled to a second line in which the alternating current signal is conveyed. The second switch can be coupled to the first switch. The first switch can, responsive to a magnitude of a first voltage from the first line to a terminal exceeding a magnitude of a second voltage from the second line to the terminal, pass current from the first line to the terminal. The second switch can, responsive to the magnitude of the second voltage exceeding the magnitude of the first voltage, pass current from the second line to the terminal.

At least one aspect is directed to a method for energy conversion. The method can include receiving an indication of a voltage of an alternating current signal between a first line and a second line. The method can include generating control signals to generate a signal for a neutral line of the alternating current signal based on the voltage between the first line and the second line. The control signals can include a first gate voltage for a first transistor of a first switch. The control signals can include a second gate voltage for a second transistor of the first switch. The control signals can include a third gate voltage for a third transistor of a second switch. The control signals can include a fourth gate voltage for a fourth transistor of the second switch. Generating the control signals can include, responsive to an indication of a negative voltage between the first line and the second line, providing the first gate voltage and the third gate voltage to cause channel conduction for the first transistor and the third transistor. Generating the control signals can include providing the second gate voltage and the fourth gate voltage to cause channel conduction for the second transistor and the fourth transistor. Generating the control signals can include providing, as complementary signals, the second gate voltage and the fourth gate voltage. Generating the control signals can include, responsive to an indication of a positive voltage between the first line and the second line, providing the second gate voltage and the fourth gate voltage to cause channel conduction for the second transistor and the fourth transistor. Generating the control signals can include, responsive to an indication of a positive voltage between the first line and the second line providing, as complementary signals, the first gate voltage and the third gate voltage.

At least one aspect is directed to a circuit. The circuit can include a first switch to selectively couple a first line in which an alternating current signal is conveyed to a connection with a second switch. The first switch can include a first selectively engageable conduction path between the first line and a second selectively engageable conduction path. The first switch can include the second selectively engageable conduction path between the first selectively engageable conduction path and the connection. The first switch can include a third conduction path parallel to the first selectively engageable conduction path. The first switch can include a fourth conduction path parallel to the second selectively engageable conduction path. The circuit can include a second switch configured to separate the connection from a second line of the alternating current signal. The second switch can include a fifth selectively engageable conduction path between the connection and a sixth selectively engageable conduction path. The second switch can include the sixth selectively engageable conduction path between the fifth selectively engageable conduction path and the second line. The second switch can include a seventh conduction path parallel to the fifth selectively engageable conduction path. The second switch can include an eighth conduction path parallel to the sixth selectively engageable conduction path.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of energy conversion. The various concepts introduced above and discussed in greater detail below may be implemented in any of numerous ways.

This disclosure is generally directed to systems and methods for generating a split-phase power output from a single-phase input. Electric vehicles can include substantial battery capacity, which can provide power in the event of a loss of grid power. The battery can be configured to supply a single-phase source (e.g., a voltage source from a first and second line). For example, an input received from the battery, via an inverter, can include an alternating current (AC) input for vehicle charging (e.g., a 240V single phase signal). An energy sink, such as some North American residences, can include split-phase power wherein the (e.g., 240V) AC signal is provided along with a neutral line to provide one or more lower voltage outputs (e.g., 120V). For example, the energy sink can include two outputs offset 180° from each other, which are provided to unbalanced loads. A circuit according to the present disclosure can generate a neutral line for unbalanced loads from the single-phase source.

A circuit can include a first and second switch, each switch including a transistor pair coupled with a diode (e.g., body diodes of the transistors). The switches can be selectively actuated to cause current to flow between the first line or the second line of the single-phase source, and a neutral line. The flow of the current can be configured to balance a load to maintain the neutral line at a voltage of about halfway between the first line and the second line (e.g., at a ground voltage). A filtering circuit can include an inductor between the first and second switches and the neutral line. The filtering circuit can include an inductor-capacitor network to smooth switching currents. The inductor can be sized according to an operating frequency of the system. A higher frequency system can correspond to a smaller, lower weight, inductor. For example, the input frequency can include a mains frequency of about 50 Hz or 60 Hz, wherein an operating frequency of the switches can be in the kHz range (e.g., 100 kHz).

Figure 1:
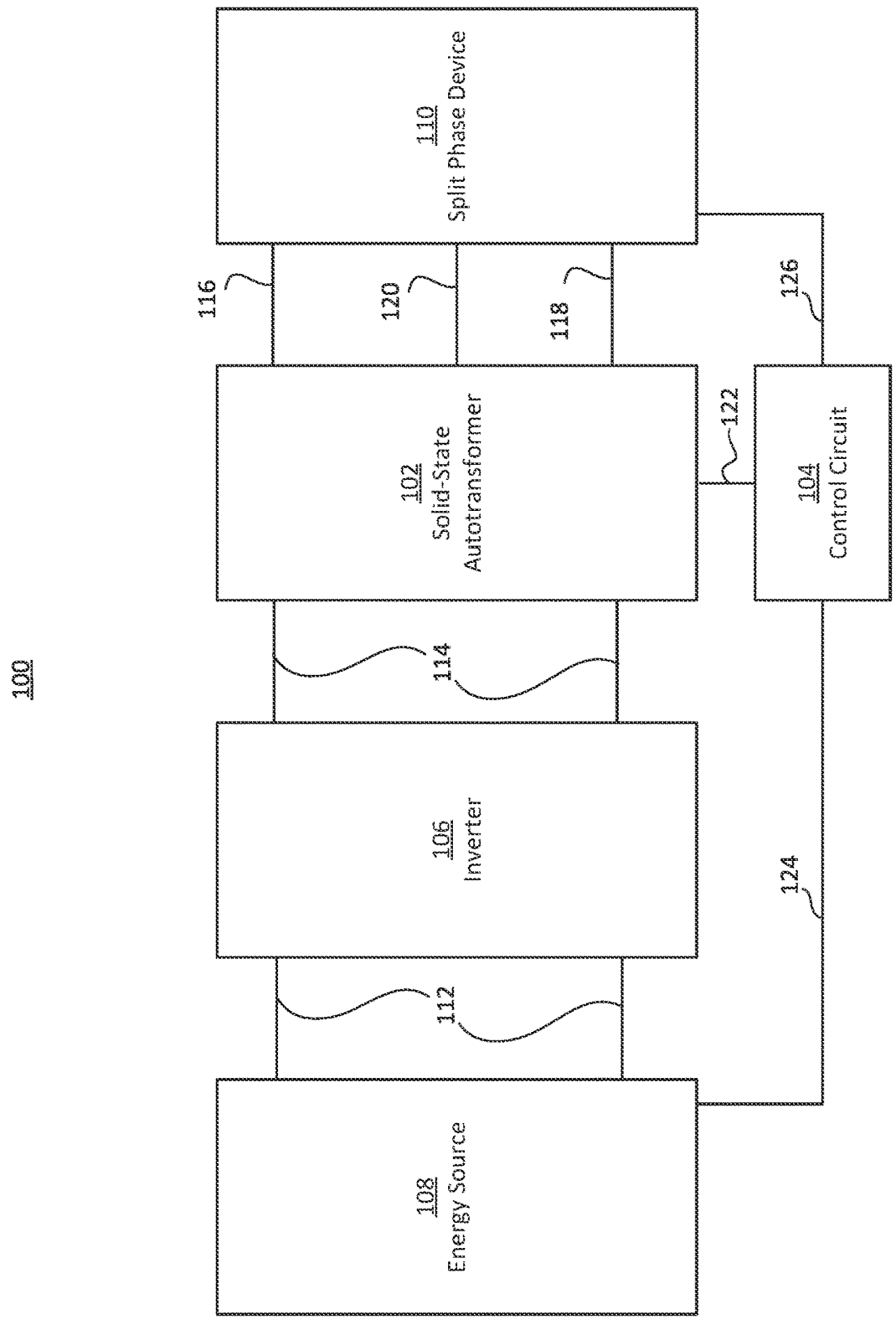
FIG. 1 depicts a system to exchange energy between devices, in accordance with some aspects.

FIG. 1 depicts a system 100 to exchange energy between devices, in accordance with some aspects. A solid-state autotransformer 102 (SSAT) can be configured to generate a split-phase output from a single-phase input. One or more phases of the split-phase output can be provided to a split-phase device 110, such as a residence. The SSAT 102 can operate based on control signals 122 generated by a control circuit 104. The SSAT 102 can receive energy from an energy source 108 such as a grid, generator, or a battery of an electric vehicle. For example, an inverter 106 can provide an alternating current (AC) signal from a DC source, such as the battery of the electric vehicle. (e.g., a 240 V AC signal). The AC signal can include a sine wave (e.g., a stepped sine wave or continuous sine wave). For example, the alternating current signal can be configured to match a mains frequency of a grid.

Energy can flow from the energy source 108 along a DC link 112, whereupon the inverter 106 can generate an AC signal for conveyance over a pair of AC line wires 114. The AC line wires 114 can omit a neutral line. For example, the inverter 106 can be configured to operate between electric vehicles or other sources or sinks which operate at a 240 volt level (referring to a nominal root means squared (RMS) voltage, which may also be referred to as, for example, 220 volts RMS, 230 volts RMS, or 340 volts peak-to-peak). The AC line wires 114 can extend, via the SSAT 102, to a split-phase device 110. Particularly, the SSAT 102 can provide a first line 116, a second line 118, and a neutral line 120 to the split-phase device 110. A load at the split-phase device 110 can include one or more loads connected to the first line 116 and second line 118. For example, HVAC units, large appliances, or industrial equipment can connect to the first line 116 and second line 118 at a national electrical manufacturers association (NEMA) 6-15, NEMA 6-20, hardwired connectors, or so forth.

The load at the split-phase device 110 can include one or more loads connected to a neutral line 120, disposed at a voltage between the first line 116 and the second line 118. For example, an AC signal from the neutral line to the first line (L1), or another AC signal from the neutral line to the second line (L2) can receive current from the first line 116 or second line 118. An unbalanced portion of the draw, from L1 and L2 can return along the neutral line. That is, the SSAT 102 can operate by actuating switches to cause current to flow between the first line 116 or the second line 118 and the neutral line 120, to balance the split-phase output.

Control signals 122 provided to the SSAT 102 from the control circuit 104 can include open loop or closed loop control. For example, the control signals 122 can be provided according to a predetermined pattern, or can vary according to a sensed voltage or current of the SSAT 102. Further, the control circuit 104 can receive input from other sources, such as from the energy source 108 (e.g., to determine a state of charge, temperature, or other condition information) over a first side channel 124. Based on the receipt of the condition information, the control circuit 104 can selectively decouple the energy source 108 from the split-phase device 110, such as to arrest a flow of energy upon a detection of a battery state of charge (SoC) below a threshold, a battery temperature above a threshold, or so forth. For example, a controller or other control circuit 104 can receive an indication of a battery condition for a battery of an electric vehicle.

The control circuit 104 can receive input from other sources, such a over a second side channel 126, which can interface with the split-phase device 110 or with a grid to determine a grid condition (not depicted). Based on the grid condition, the control circuit can adjust an operation of the solid-state device, inverter 106, or so forth (e.g., to halt a delivery of power, or to charge the energy source 108). For example, the control circuit 104 can engage the SSAT 102 responsive to a detection of a grid condition such as a blackout or brownout, and disengage the SSAT 102 responsive to a restoration of the grid.

The engagement or disengagement can refer to the actuation of switches of the SSAT 102 to balance the neutral line 120. In a disengaged state, the split-phase device 110 can remain connected to the energy source 108, such that the energy source 108 can sink energy from the split-phase device 110, or otherwise receive energy from the grid. For example, the inverter 106 can be an inverter/rectifier configured to rectify an AC signal to charge the energy source 108 during one mode of operation and invert a DC signal received from the energy source to provide an AC signal in another mode of operation. An inverter 106 can be substituted for a filter or omitted when employed in combination with an AC energy source such as a generator.

Figure 2:
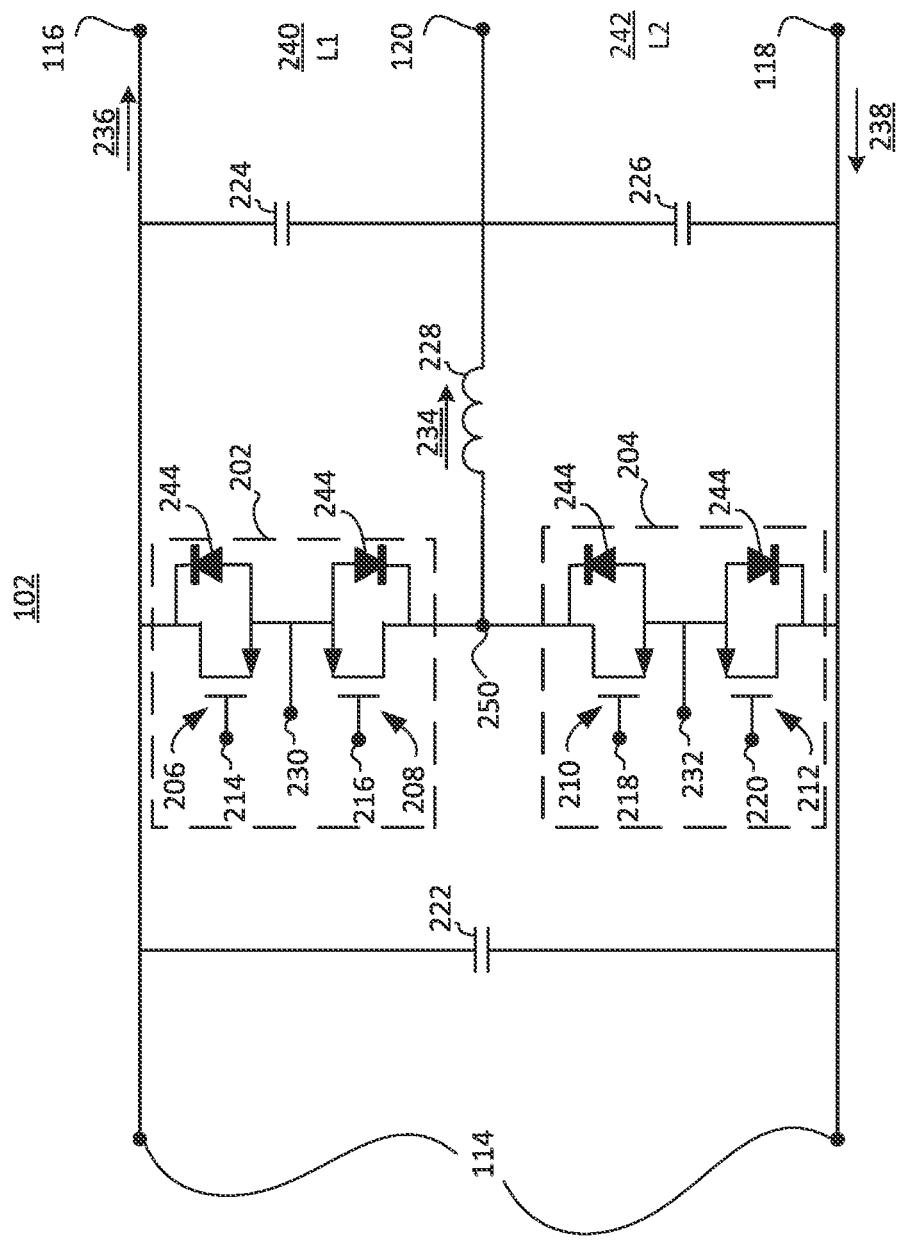
FIG. 2 depicts a solid-state autotransformer, in accordance with some aspects.

FIG. 2 depicts a solid-state autotransformer (SSAT) 102, in accordance with some aspects. At an input to the circuit, AC line wires 114 are shown, which can convey an alternating current signal. For example, the AC line wires 114 can include a first line 116 and a second line 118. A first switch 202 can control a flow of current between the first line 116 and a terminal 250 which may be or include a neutral connection, neutral line 120, or other voltage between a voltage of the first line 116 from a voltage of the second line 118. A second switch 204 can control a flow of current between the second line 118 and the terminal 250 for the neutral line 120. The switches 202, 204 can control the flow of current in one or more directions. For example, the switches 202, 204 can be configured to open to allow a flow in either direction according to a relative voltage, or can be configured to open directionally, to restrict a flow of current to or from the neutral line 120.

Each switch can include a pair of selectively engageable conductive channels (e.g., transistor channels gated by a gate voltage). Another conduction channel can be diposed in parallel with each of the selectively engageable conductive channels (e.g., a diode, such as a body diode of the transistor or a discrete diode in parallel with the transistor channel). For example, the cathodes of the diodes can connect to the first line 116 and the terminal 250, and the anodes can connect to each other. As depicted, a first transistor 206 and second transistor 208 can include gate terminals configured to interface with control signals 122. For example, the first transistor 206 can include a first gate terminal 214 and the second transistor 208 can include a second gate terminal 216. The first switch 202 can engage to allow current to pass from the neutral line 120 to the first line 116 or from the first line 116 to the neutral line 120. The depicted transistors are not intended to be limiting and can be substituted for other switching elements. For example, the switch elements can include a field effect transistor (FET) such as a metal oxide semiconductor (MOS) FET. The switch elements can include insulated gate bipolar transistor (IGBT) or another device such as a thyristor, relay (e.g., solid-state relay), silicon-controlled rectifier (SCR), or so forth.

According to a first load profile, wherein a different load is connected between the first line 116 and the neutral line 120 (L1 240) than between the neutral line 120 and the second line 118 (L2 242), a neutral current 234 will flow. For example, for an L1 load of 20A and an L2 load of 10A, a first current 236 of 20A will flow from the first line 116 to the neutral line 120, a neutral current 234 of −10 A will flow across the inductive element 228, and a second current 238 of 10 A will return from the second line 118. Wherein the AC line wires 114 provide a balanced load, (e.g., of 10 A), the first switch can actuate to pass a net current of 10 A from a terminal 250 of the inductive element 228 to the first line 116.

The first switch 202 and second switch 204 can operate according to a same predefined pattern, wherein the net current flow can center based on a relative voltage of the first line 116, the second line 118, and the neutral line 120. For example, the first switch 202 and second switch 204 can operate according to the patterns of FIG. 3 and FIG. 4. The second switch 204 can be symmetrical to the first switch 202. For example, as depicted, the second switch 204 can include a third transistor 210 and fourth transistor 212. The second switch 204 can include gate terminals configured to interface with control signals 122, such as a third gate terminal 218 and a fourth gate terminal 220, respectively.

The control circuit 104 can actuate (that is, switch) the switches 202, 204 according to sensed feedback. For example, the control circuit 104 can determine a magnitude of a voltage between the first line 116 and the neutral line 120 and a magnitude of a voltage from the second line 118 to the neutral line 120. For example, the first switch 202 and the second switch 204 can operate to center the terminal 250 (e.g., the neutral line 120) between the outputs. The control circuit 104 can actuate each switch 202, 204 based on an input from one or more sensors configured to detect a voltage at or across various components. For example, first switch 202 can include a first sense point 230 to determine a voltage, current or other information regarding the operation thereof. The second switch 204 can include a second sense point 232. The various sense points or gate drivers for the gates of the transistors can be electrically isolated from other portions of the circuit, floating, or otherwise separated from the AC line wires 114.

The SSAT 102 can include a filter to smooth currents switched by the respective switches. For example, a filter can include an inductive element 228 separating a terminal 250 between the first switch 202 and the second switch 204 from an opposite terminal 250 corresponding to the neutral line 120. The filter can include a capacitor 224 between the neutral line 120 and the first line 116, and another capacitor 226 between the neutral line 120 and the second line 118. The inductive element 228, in combination with the capacitors 224, 226 can smooth switched currents. For example, the inductive element 228 can retard voltage swings of the neutral line 120, wherein the capacitors 224, 226 can sink or source current, smoothing changes. Example waveforms are provided hereinafter, at FIG. 3 and FIG. 4. A further capacitor 222, disposed between the AC line wires 114 can hold up a voltage thereof, which may reduce transients of a switching current with respect to an energy source for the AC line wires 114 (e.g., the inverter 106 or a battery of an electric vehicle).

Figure 3:
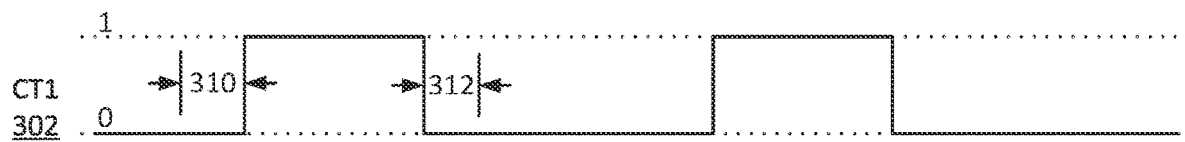
FIG. 3 depicts a waveform set for a solid-state autotransformer, in accordance with some aspects.
Figure 3:
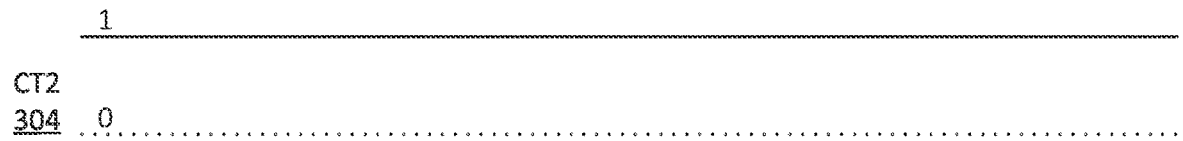
Figure 3:
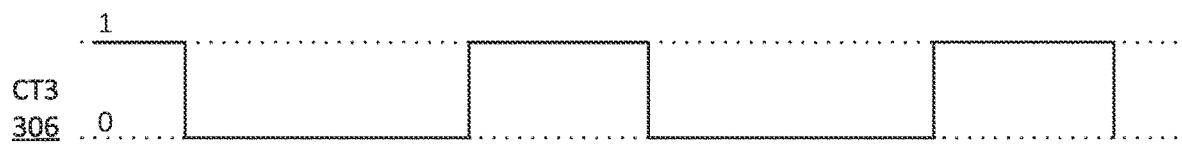
Figure 3:
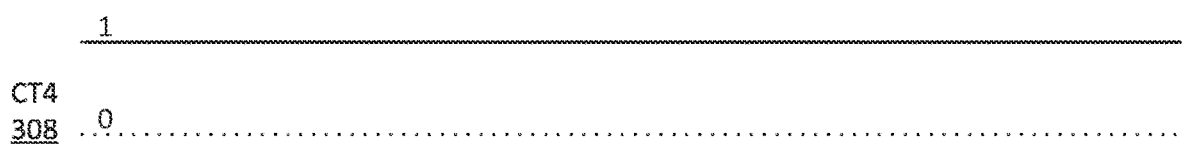
Figure 3:
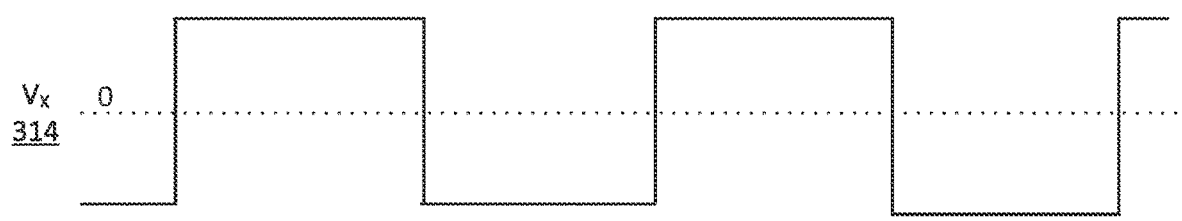
Figure 3:
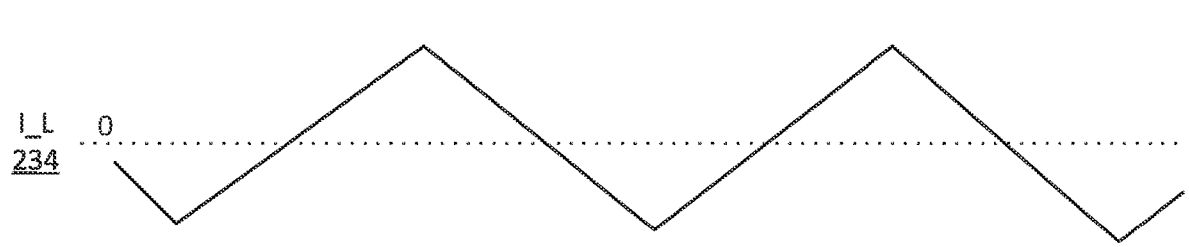

FIG. 3 depicts a waveform set 300 for a solid-state autotransformer, in accordance with some aspects. For example, the waveforms can correspond to the operation of the SSAT 102 of FIG. 2, wherein a voltage of the first line 116 with respect to the second line 118 is positive. The control circuitry can determine the positivity according to a sensed voltage or current, or based on a temporal phase of a signal. Although the voltage of the first line 116 with respect to the second line 118 can be time-variant, the switching speeds of the depicted signals can be greater than a frequency of a signal of the AC line wires 114, such that several of the depicted operations can be performed during a half-period of the signal of the AC line wires 114 (e.g., while the voltage of the first line 116 exceeds the voltage of the second line 118).

The waveforms include a first control signal 302 configured to actuate the first transistor 206. Although depicted as an active high signal (e.g., corresponding to an input to the gate of an n-channel transistor), various circuits can employ different devices which can include active low or other signal types. A second control signal 304 (corresponding to the second transistor 208) and a fourth control signal 308 (corresponding to the fourth transistor 212) are maintained in an active state. Thus, a current can flow away from the neutral line 120 to the first line 116 or the second line 118 (e.g., through a body diode 244). During an active portion of the first control signal 302, current can flow to the neutral line 120 from the first line 116 over the conduction channels of the first transistor 206 and the second transistor 208. During a complementary period of the third control signal 306, current can flow to the neutral line 120 from the second line 118 over the conduction channels of the third transistor 210 and the fourth transistor 212.

The first control signal 302, corresponding to an input signal for the first gate terminal 214 of the first transistor 206, is depicted as complementary to a third control signal 306, the third control signal 306 corresponding to the third gate terminal 218 of the third transistor 210. Complementary signals can refer to a signal pair including one signal which is active while another is inactive, and inactive while the other signal is active. The complementary signals can have a 50% duty cycle, wherein one of the signals is active at all times. The complementary signals can include a dead time, wherein both signals are inactive at a same time. As shown, the dead time can include a first elapsed time 310, immediately following a falling edge of the third control signal 306, and preceding a rising edge of the first control signal 302. The dead time can further include a second elapsed time 312, immediately following a falling edge of the first control signal 302, and preceding a rising edge of the third control signal 306. The dead time can prevent simultaneous conductance of the first switch 202 and the second switch 204 (e.g., to short the AC line wires 114). The first elapsed time 310 can be of a same or different duration as the second elapsed time 312. For example, the control signals 122 can be configured to cause the first switch 202 to close for a different duration than the second switch 204, to adjust a voltage of a terminal 250 of the inductive element 228.

A voltage of the neutral line 120 can be centered around a voltage halfway between the first line 116 and the second line 118. The voltage of the neutral line 120 can be connected to a ground (e.g., through a protection circuit). For example, the first line 116 can be at 120 V RMS, relative the neutral line 120, and the second line 118 can be another 120 V RMS line, relative the neutral line, offset from the first line 116 by 180°. The switching voltage of the depicted control signals 122 can be substantially (e.g., one or more orders of magnitude) greater than a fundamental frequency of the AC line wires 114, such that the voltage of the AC line wires 114 is relatively stable during the depicted waveforms. For example, the voltage of the first line 116 can be about 50 V, 100V, or 150V, and the voltage of the second line 118 can be offset therefrom by 180° (e.g., can be about −50 V, −100V, or −150V).

A voltage of a terminal 250 of the inductive element 228 proximal to the first switch 202 and the second switch 204, relative to the neutral line 120 can be defined as $V_X$ 314. That is, $V_X$ 314 can describe a voltage across the inductive element 228, wherein the neutral line is a ground. A $V_X$ 314 voltage can increase during a period of an active conduction channel of the first switch 202. For example, while the first control signal 302 is active, the $V_X$ 314 voltage can be positive, and an inductor current 234 (also referred to as an inductor current 234) can increase. Upon a falling edge of the first control signal 302, $V_X$ 314 can drop to a negative voltage, wherein the inductor current 234 can decrease. The inductor current 234 or $V_X$ 314 can be substantially centered about 0 in some instances. In some instances, according to an asymmetry between the AC line wires 114, the net current can aggregate to a non-zero value, such as 10 A in the previous example. That is, the time average of the inductor current 234 can represent a current equal to an imbalance between the first line 116 and the second line 118 such that the load, as seen by the input of the AC line wires 114 can be symmetrical or substantially symmetrical.

Figure 4:
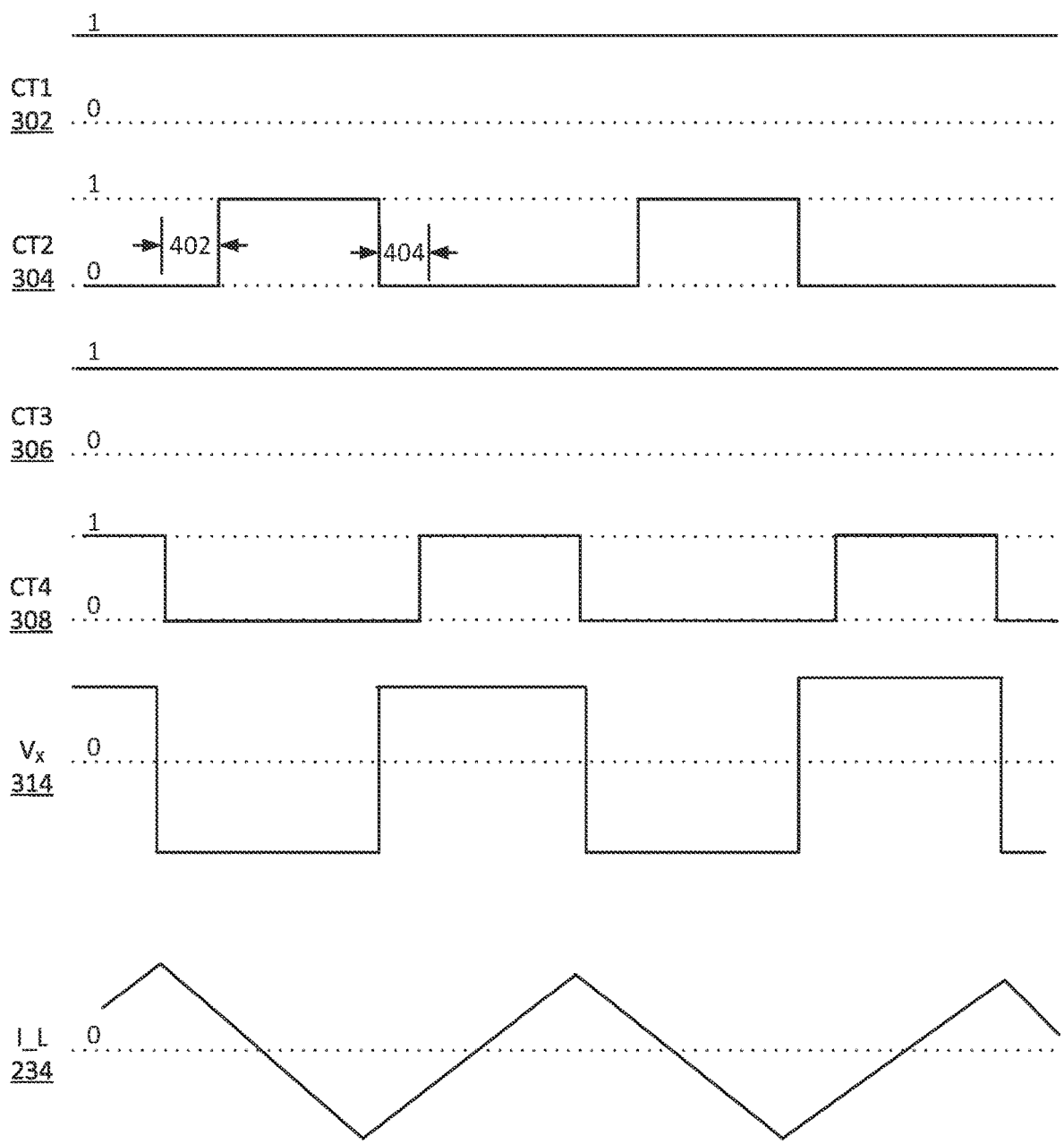
FIG. 4 depicts a waveform set 400 for a solid-state autotransformer, in accordance with some aspects.

FIG. 4 depicts a waveform set 400 for a solid-state autotransformer, in accordance with some aspects. For example, the waveforms can correspond to the operation of the SSAT 102 of FIG. 2, wherein a voltage of the first line 116 is negative with respect to the second line 118. The control circuitry 104 can determine the positivity according to a sensed voltage or current, or based on a temporal phase of a signal.

The first control signal 302 and third control signal 306 are maintained in an active state. The second control signal 304 and fourth control signal 308 are provided as complementary signals, having a dead time including a third elapsed time 402 and a fourth elapsed time 404. The voltage across the inductor, $V_X$ 314, can be positive with the active state of the second switch 204, based on the fourth control signal 308, and negative with an active state of the first switch 202, based on the second control signal 304.

Figure 5:
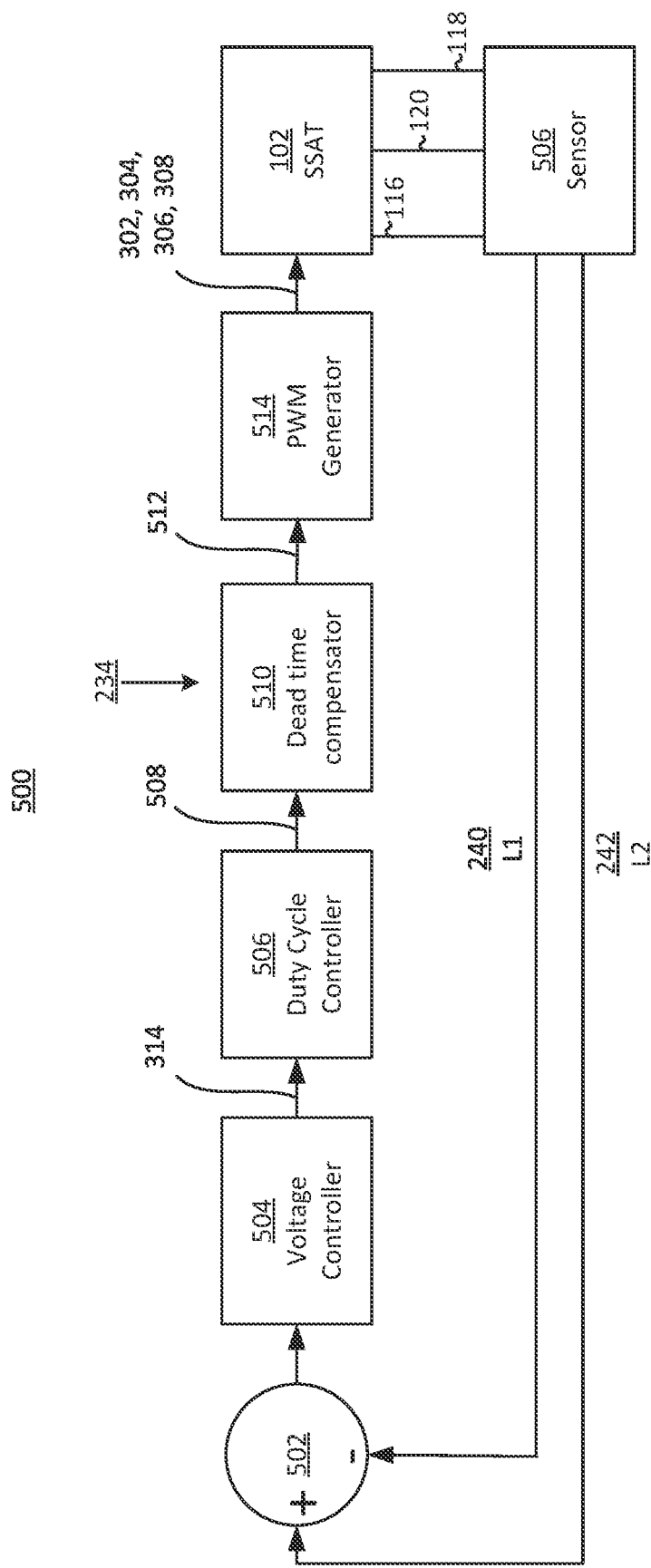
FIG. 5 depicts a flow diagram for a control system, in accordance with some aspects.

FIG. 5 depicts a flow diagram for a control system 500, according to some aspects. The control system 500 be implemented as a proportional integral (PI) controller, proportional derivative (PD) controller, proportional-integral-derivative (PID) controller, etc. The control circuit 104 can implement the control system 500 according to one or more discrete circuits, processor instructions, or other implementations, such as implementations discussed with regard to any of the elements of FIG. 8.

A summation element 502 of the control system 500 can compare a difference between the neutral line 120 and each of the first line 116 and the second line 118 to determine a signal input (sometimes referred to as an error signal). The signal input can include an indication of a voltage difference between the first line 116 and the second line 118. For example, the signal input can determine a disposition of the voltage of the neutral line 120 relative to the first line 116 and the second line 118. That is, the summation element 502 can determine a deviation of a voltage of the neutral line 120 from a midpoint between the first line 116 and the second line 118.

Based on the signal input, a voltage controller 504 component can determine a target $V_X$ 314 (e.g., time-average thereof), which may include a zero or non-zero value (e.g., may be centered about a zero or non-zero value). For example, for an unbalanced load, the average voltage across the inductive element 228, $V_X$ 314, can be positive or negative, corresponding to a net flow of current there-across. A duty cycle controller 506 component can determine a duty cycle 508 of control signals 122. For example, the duty cycle 508 can correspond to a symmetric or asymmetric active time for the first switch 202 or the second switch 204. The duty cycle 508 can depict a relative active time between the switches 202, 204 (e.g., exclusive of dead time), or can be based on a total active time.

A dead time compensator 510 can determine an adjustment to a duty cycle time of any of the control signals to generate an adjusted duty cycle 512. For example, the dead time compensator 510 can cause an increase to an active (e.g., high) time of the first control signal 302 and a decrease to an active (e.g., high) time of the third control signal 306 to adjust a position of the first elapsed time 310, second elapsed time 312, third elapsed time 402, or fourth elapsed time 404. The dead time compensator 510 can determine the adjustment based on a neutral current 234, which may be measured as a current through the inductive element 228. For example, the dead time compensator 510 can adjust a duty cycle to maintain an average, minimum, or maximum current. The adjustments may be symmetrical or asymmetrical between or within switches.

A PWM generator 514 can generate control signals 122 to control the switches. For example, the control signals 122 can include the first control signal 302, the second control signal 304, the third control signal 306, and the fourth control signal 308. The control signals 122, as provided to the SSAT 102, can cause the neutral line 120 to maintain a voltage at a midpoint, or otherwise intermediating the first line 116 from the second line 118. For example, the control signals 122 can be configured to cause a current through the inductive element 228 to maintain a voltage of a neutral line 120 such that each of an L1 240 and L2 242 voltage are 120 V AC signals, based on an input of a 240 V AC signals, centered about a ground voltage. That is, the control signals 122 can be configured to convey any portion of an unbalanced load between the first line 116 or the second line 118 and the neutral line 120.

Figure 6:
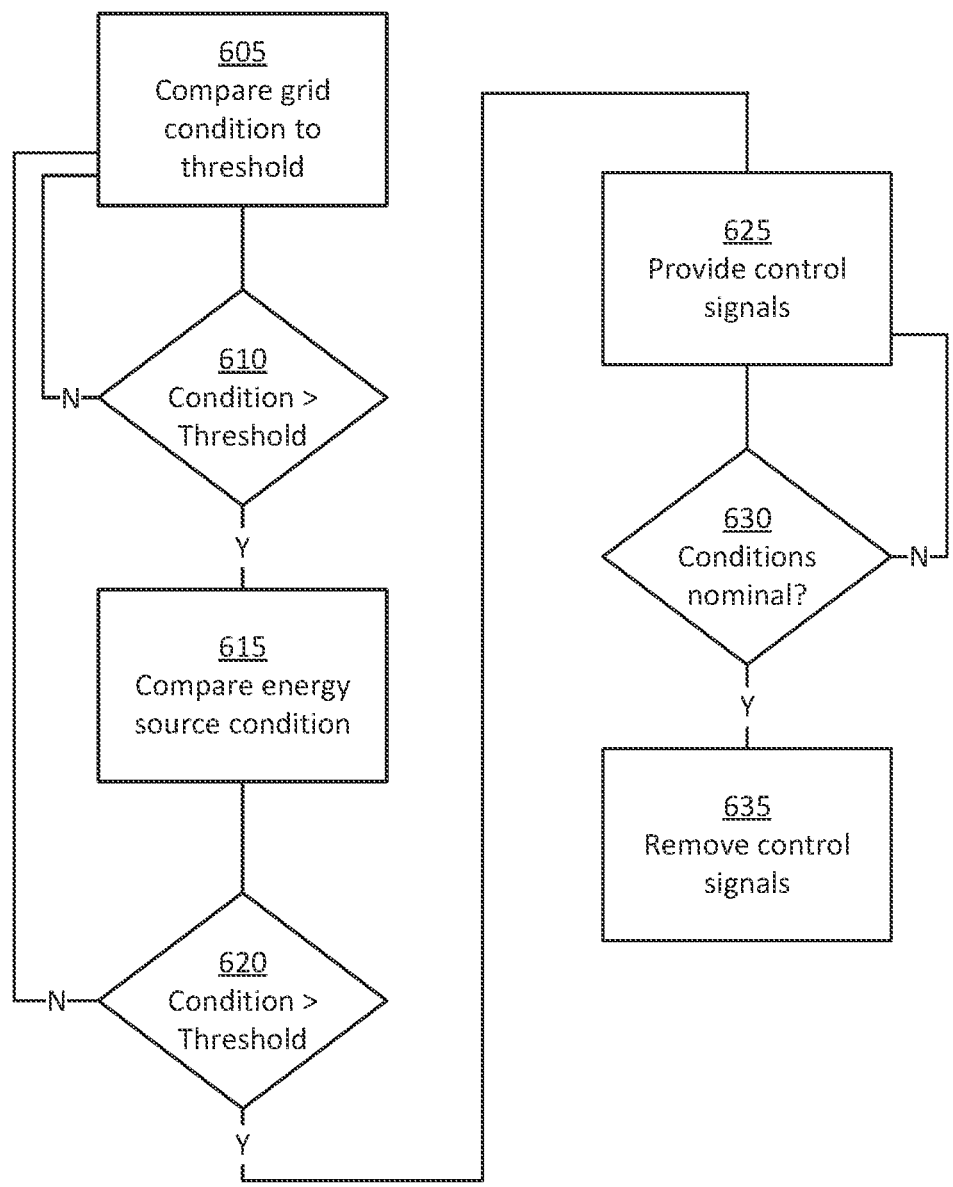
FIG. 6 depicts a flow chart for supplying energy to a split-phase device, in accordance with some aspects.

FIG. 6 depicts a flow chart for a method 600 of supplying energy to a split-phase device 110, in accordance with some aspects. The method 600 can be performed by one or more systems or components depicted in FIG. 1-2, 5, or 8 including a data processing system. For example, the method 600 can be performed by one or more control circuits 104. Some control circuits 104 can include a controller coupled to a memory device. For example, the control circuits 104 can include any of the devices of FIG. 8.

At ACT 605, the control circuit 104 can compare a grid condition to a threshold. The comparison may be indicative of a grid failure. For example, a blackout or brownout grid condition can be determined by comparing to a grid voltage to a voltage threshold; a frequency deviation can be determined by comparing a mains frequency to a threshold such as 50/60 Hz+/−5%. The grid condition can be measured based on a supply of a grid voltage to a home or other device. At decision block 610, wherein the grid condition indicates a nominal condition, the control circuit 104 can decouple the SSAT 102 (e.g., by opening the first switch 202 or the second switch 204). The decoupling can interrupt current flow to or from a neutral line 120, but may not necessarily interrupt a connection of the first line 116 or second line 118. For example, the control circuit 104 can cause a charging of an energy storage device such as a battery of an electric vehicle, or maintain a state of the battery of the electric vehicle. Wherein the grid condition indicates a non-nominal condition, (e.g., overvoltage, undervoltage, frequency deviation, etc.), the method 600 can proceed to ACT 615.

At ACT 615, the control circuit 104 can compare one or more conditions associated with an energy source to a predefined condition, such as a threshold or state. For example, the energy source 108 can include a generator having a condition related to a fuel supply, a solar panel having a condition related to solar intensity, or a battery of an electric vehicle. A battery condition can include a SoC, temperature, or other battery states. The battery condition can be received from one or more controllers of or associated with an electric vehicle, such as a battery management system (BMS), on-board charging controller (OBC), electric vehicle supply equipment (EVSE) controller, or so forth. At decision block 620, the control circuit 104 can determine whether energy can be exported from the energy source 108, such as by comparing an indication of a condition (e.g., SoC percent) to a threshold. Responsive to a determination that energy cannot be exported from the energy source 108, the method 600 can proceed to ACT 605. Responsive to a determination that energy can be exported from the energy source 108, the method 600 can proceed to ACT 625.

At ACT 625, the control circuit 104 can provide control signals to the solid-state autotransformer 102, to cause a provision of energy to a load (e.g., a residence, or another load, such as an AC load from an electric vehicle for an auxiliary device). Prior to provisioning the energy to the load, the control circuit 104 can decouple the grid from the first line 116 or the second line 118. The control circuit 104 can cause an activation of an OBC of an electric vehicle, startup a generator, or otherwise interface with an energy source 108 to provide a single-phase AC signal to the AC lines 114. The control circuit 104 can further activate the solid-state autotransformer 102, such as by the provision of various control signals 122 to cause an actuation of the switches thereof. During the provision of the control signals 122, the control circuit 104 can receive an indication of a grid condition and battery condition (or other energy source 108 condition). At decision block 630, responsive to a continued availability of energy from the energy source 108, and non-nominal grid condition, the method can remain at ACT 625. Responsive to a nominal grid condition or non-nominal energy source condition (e.g., a restoration of grid power, battery SoC depletion or temperature, or so forth), the method 600 can proceed to ACT 635.

At ACT 635, the control circuit 104 can remove the control signals 122 from the SSAT 102, or place the signals to an inactive state. For example, the control circuit 104 can provide inactive signals to open the switches 202, 204. The control circuit 104 can further cause, monitor, or otherwise control a supply of energy between the grid and the energy source 108 (e.g., to recharge a battery of an electric vehicle).

Like other portions of the present disclosure, the provided illustrative method 600 is not intended to be limiting. Additional, fewer, or different operations can be included in the method 600, or various operations can be omitted. For example, the method can include providing a notification of a state of an electric vehicle, the grid, or the control circuitry. For example, the control circuit 104 can provide an indication of an amount of available energy in the energy source, or provide an indication of the grid condition. For example, the control circuit 104 can push a notification or otherwise provide information to a mobile application. The information can include an indication of remaining energy, a current load, or a time remaining until depletion.

Figure 7:
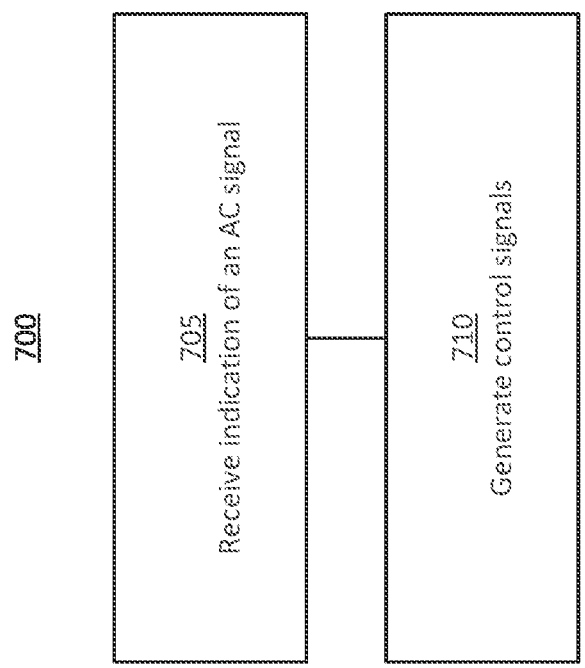
FIG. 7 depicts another flow chart for supplying energy to a split-phase device, in accordance with some aspects.

FIG. 7 depicts another flow chart for a method 700 of supplying energy to a split-phase device 110, in accordance with some aspects. The method 700 can be performed by one or more systems or components depicted in FIG. 1-2, 5, or 8 including a data processing system. For example, the method 700 can be performed by one or more control circuits 104. Some control circuits 104 can include a controller coupled to a memory device. For example, the control circuits 104 can include any of the devices of FIG. 8.

At ACT 705, the control circuit 104 can receive an indication of an AC signal. The AC signal can be an AC signal between a first line 116 and a second line 118. For example, the AC signal can be or can be indicative of a grid condition. That is, the first line 116 and the second line 118 can selectively couple to the grid, wherein the condition can be indicative of a grid condition. The AC signal between the first line 116 and the second line 118 can be a signal generated by an AC charger (e.g., an OBC of an electric vehicle). For example, the signal can be 240 V AC signal. The indication of the signal can be an indication of a voltage of the signal, relative to a ground, neutral or other terminal, or between the terminals. For example, the indication can include an indication of a positive or negative voltage between the first line 116 and the second line 118.

At ACT 710, the control circuit 104 can generate control signals 122 to generate a signal for a neutral line 120 of an output of the SSAT 102. The control signals 122 can include a first control signal 302 to impose a first gate voltage for a first transistor 206 of the first switch 202. The control signals 122 can include a second control signal 304 to impose a second gate voltage for a second transistor 208 of the first switch 202. The control signals 122 can include a third control signal 306 to impose a third gate voltage for a third transistor 210 of the second switch 204. The control signals 122 can include a fourth control signal 308 to impose a fourth gate voltage for a fourth transistor 212 of the second switch 204.

The control circuit 104 can generate the control signals 122 based on a voltage between the first line 116 and the second line 118. For example, responsive to an indication of a negative voltage between the first line 116 and the second line 118, the control circuit 104 can provide the first gate voltage and the third gate voltage to cause channel conduction for the first transistor 206 and the third transistor 210. For example, the control circuit 104 can maintain the first transistor 206 and the third transistor 210 in an active state (e.g., close the portion of the switch). The control circuit 104 can provide, as complementary signals, the second gate voltage and the fourth gate voltage, to alternate conduction between the first switch 202 and the second switch 204 (e.g., through a conduction path of the diodes 244).

Responsive to an indication of a positive voltage between the first line 116 and the second line 118, the control circuit 104 can provide the second gate voltage and the fourth gate voltage to cause channel conduction for the second transistor 208 and the fourth transistor 212. For example, the control circuit 104 can maintain the second transistor 208 and the fourth transistor 212 in an active state (e.g., close the portion of the switch). The control circuit 104 can provide, as complementary signals, the first gate voltage and the third gate voltage, to alternate conduction between the first switch 202 and the second switch 204 (e.g., through a conduction path of the diodes 244).

Figure 8:
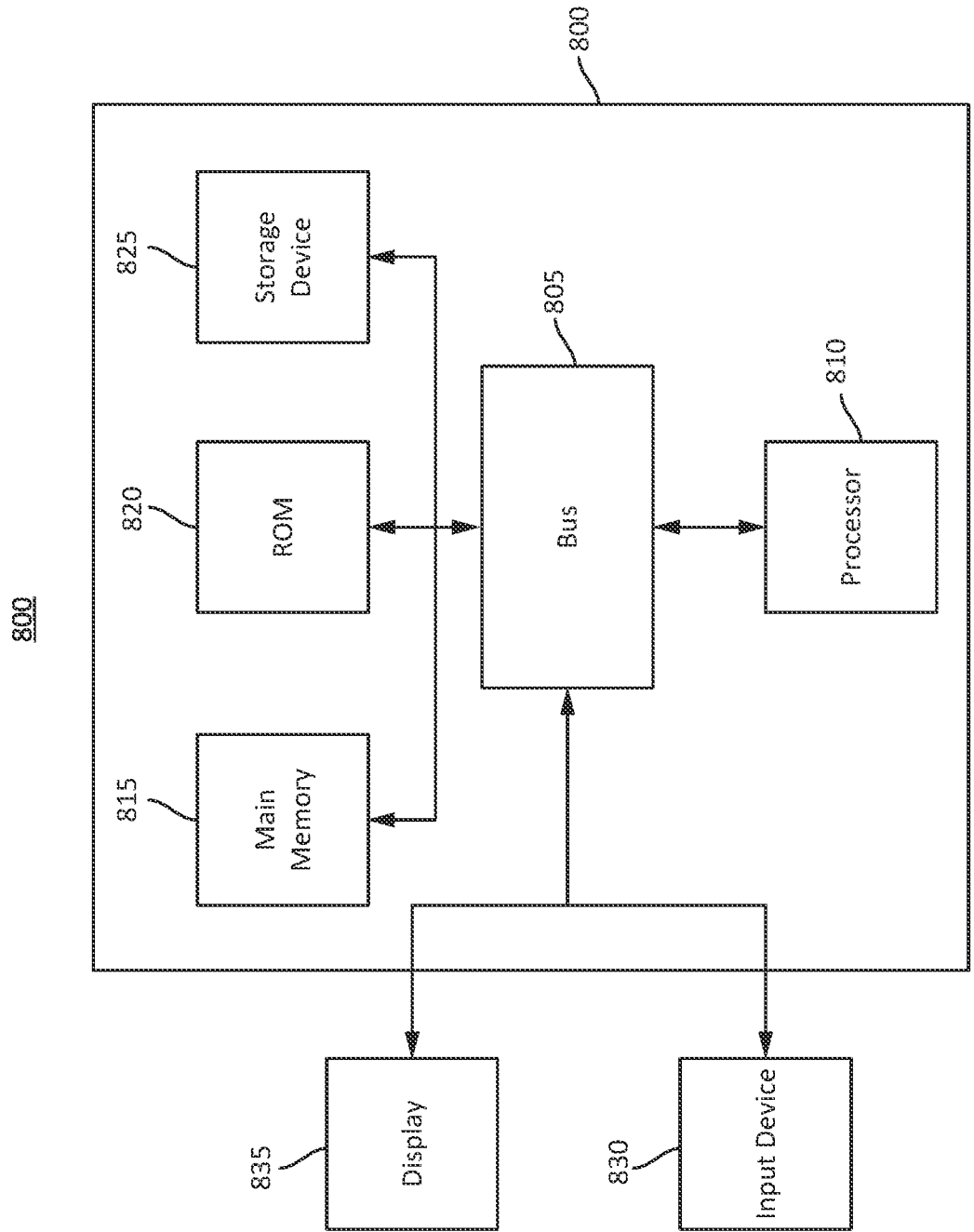
FIG. 8 is a block diagram illustrating an architecture for a computer system that can be employed to implement elements of the systems and methods described and illustrated herein.

FIG. 8 depicts an example block diagram of an example computer system 800. The computer system or computing device 800 can include or be used to implement a data processing system (e.g., a control circuit 104) or its components. The computing system 800 includes at least one bus 805 or other communication component for communicating information and at least one processor 810 or processing circuit coupled to the bus 805 for processing information. The computing system 800 can also include one or more processors 810 or processing circuits coupled to the bus for processing information. The computing system 800 also includes at least one main memory 815, such as a random access memory (RAM) or other dynamic storage device, coupled to the bus 805 for storing information, and instructions to be executed by the processor 810. The main memory 815 can be used for storing information during execution of instructions by the processor 810. The computing system 800 may further include at least one read only memory (ROM) 820 or other static storage device coupled to the bus 805 for storing static information and instructions for the processor 810. A storage device 825, such as a solid-state device, magnetic disk or optical disk, can be coupled to the bus 805 to persistently store information and instructions.

The computing system 800 may be coupled via the bus 805 to a display 835, such as a liquid crystal display, or active matrix display, for displaying information to a user such as a user disposed within a cabin of an electric vehicle or exterior to the cabin. An input device 830, such as a button or voice interface may be coupled to the bus 805 for communicating information and commands to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835.

The processes, systems and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. Hard-wired circuitry can be used in place of or in combination with software instructions together with the systems and methods described herein. Systems and methods described herein are not limited to any specific combination of hardware circuitry and software.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system for energy conversion, comprising:
   a first switch coupled to a first line in which an alternating current signal is conveyed;
   a second switch coupled to a second line in which the alternating current signal is conveyed, and to the first switch, the first switch to, responsive to a magnitude of a first voltage from the first line to a terminal exceeding a magnitude of a second voltage from the second line to the terminal, pass current from the first line to the terminal;
   the second switch to, responsive to the magnitude of the second voltage exceeding the magnitude of the first voltage, pass current from the second line to the terminal; and
   a controller to:
   responsive to a determination of a first grid condition, decouple a grid from the first line without decoupling the first line or a second line from a split-phase device or the first switch;
   responsive to a determination of a second grid condition, couple the grid to the first line without decoupling the first line or a second line from the split-phase device or the first switch;
   generate control signals corresponding to a first duty cycle for the first switch and a second duty cycle for the second switch;
   adjust the first duty cycle based on a magnitude of a current flowing to the terminal wherein the current flows to the terminal from a connection, the connection between the first switch and the second switch, wherein:
   a duration of an active portion of the first duty cycle is equal to a duration of the active portion of the second duty cycle; and
   the duration of the active portion of the first duty cycle is less than 0.5;
   receive an indication of a battery condition for a battery of an electric vehicle;
   receive an indication of a grid condition; and
   switch the first switch and the second switch based on the battery condition and the grid condition.

2. The system of claim 1, wherein a filter separates the terminal from the first switch and the second switch, the filter comprising:
   an inductor between:
      the terminal; and
      the first switch and the second switch;
   a first capacitor between the terminal and the first line; and
   a second capacitor between the terminal and the second line.

3. The system of claim 1, further comprising:
   the controller coupled to the first switch and the second switch, the controller to adjust, for each of the first switch and the second switch, a plurality of transistor inputs, the inputs to pass current from the first line to the terminal, and from the second line to the terminal.

4. The system of claim 1, wherein the first switch comprises:
   a first transistor between the first line and a second transistor;
   a first diode having a first cathode coupled to the first line and a first anode coupled to the second transistor;
   the second transistor between the first transistor and the terminal; and
   a second diode having a second cathode coupled to the terminal and a second anode coupled to the first transistor.

5. The system of claim 1, wherein the alternating current signal is received from a grid.

6. The system of claim 1, wherein the first switch comprises:
   a first source/drain of a first transistor coupled to the first line;
   a second source/drain of the first transistor coupled to a second transistor;
   a first body diode of the first transistor in parallel with a first channel thereof, the first body diode configured to pass current from the second transistor to the first line;
   a third source/drain of the second transistor coupled to the first transistor;

a fourth source/drain of the second transistor coupled to the second switch; and a second body diode of the second transistor in parallel with a second channel thereof, the second body diode configured to receive current from the first transistor.

7. A method of energy conversion, the method comprising:
receiving an indication of a voltage of an alternating current signal between a first line and a second line;
adjusting a first time of a first duty cycle based on a magnitude of a current flowing to a terminal from a connection, the connection between a first switch and a second switch; and
generating control signals to generate a signal for a neutral line of the alternating current signal based on the voltage between the first line and the second line, the control signals comprising:
a first gate voltage for a first transistor of a first switch;
a second gate voltage for a second transistor of the first switch;
a third gate voltage for a third transistor of the second switch; and
a fourth gate voltage for a fourth transistor of the second switch; wherein, generating the control signals comprises, responsive to an indication of a negative voltage between the first line and the second line:
providing the first gate voltage and the third gate voltage to cause channel conduction for the first transistor and the third transistor; and
providing, as complementary signals, the second gate voltage and the fourth gate voltage wherein:
during the first time, subsequent to a second time and prior to a third time, both of the complementary signals are inactive;
during the second time, one of the complementary signals is active and another of the complementary signals is inactive;
during the third time, one of the complementary signals is active and another of the complementary signals is inactive; and
generating the control signals comprises, responsive to an indication of a positive voltage between the first line and the second line:
providing the second gate voltage and the fourth gate voltage to cause channel conduction for the second transistor and the fourth transistor; and
providing, as complementary signals, the first gate voltage and the third gate voltage;
detecting a grid condition;
decoupling a grid from the first line responsive to the grid condition without decoupling the first line or the second line from a split-phase device or the first switch;
detecting an energy storage device condition; receiving energy from the energy storage device responsive to the energy storage device condition;
providing the energy to the split-phase device;
receiving an indication of a battery condition for a battery of an electric vehicle;
receiving an indication of a grid condition; and
switching the first switch and the second switch based on the battery condition and the grid condition.

8. The method of claim 7, wherein the alternating current signal is operating at a frequency less than 100 Hz, and the control signals are provided at a frequency of greater than 1 kHz.

9. The method of claim 7, wherein generating the control signals comprises:
adjusting a duty cycle of one or more of the complementary signals.

10. The method of claim 7, wherein:
the first switch and the second switch are coupled to the terminal for the neutral line;
a filter separates the terminal from the first switch and the second switch, the filter comprising:
an inductor between:
the terminal; and
the first switch and the second switch;
a first capacitor between the terminal and the first line; and
a second capacitor between the terminal and the second line.

11. The method of claim 7, wherein the control signals are configured to cause current to flow through:
a first diode disposed parallel to conduction channels of the first transistor;
a second diode disposed parallel to conduction channels of the second transistor;
a third diode disposed parallel to conduction channels of the third transistor; and
a fourth diode disposed parallel to conduction channels of the fourth transistor.

12. A circuit comprising:
a first switch to selectively couple a first line in which an alternating current signal is conveyed to a connection with a second switch, the first switch comprising:
a first selectively engageable conduction path between the first line and a second selectively engageable conduction path;
the second selectively engageable conduction path between the first selectively engageable conduction path and the connection;
a third conduction path parallel to the first selectively engageable conduction path; and
a fourth conduction path parallel to the second selectively engageable conduction path;
the second switch configured to separate the connection from a second line of the alternating current signal, the second switch comprising:
a fifth selectively engageable conduction path between the connection and a sixth selectively engageable conduction path;
the sixth selectively engageable conduction path between the fifth selectively engageable conduction path and the second line;
a seventh conduction path parallel to the fifth selectively engageable conduction path; and
an eighth conduction path parallel to the sixth selectively engageable conduction path; and
a controller to:
generate control signals to adjust a first duty cycle of the selective engagement of the first selectively engageable conduction path and a second duty cycle of the selective engagement of the fifth selectively engageable conduction path, based on a magnitude of a voltage between the connection and the first line wherein:
a duration of an active portion of the first duty cycle is equal to a duration of the active portion of the second duty cycle;
the duration of the active portion of the first duty cycle is less than 0.5;
responsive to a determination of a first grid condition, decouple a grid from the first line without decoupling the first line or a second line from a split-phase device or the first switch;

responsive to a determination of a second grid condition, couple the grid to the first line without decoupling the first line or a second line from the split-phase device or the first switch;

receive a battery condition;

receive a grid condition; and switch the first switch or the second switch, based on the battery condition or the grid condition.

13. The circuit of claim 12, comprising a control circuit to:

selectively engage the first selectively engageable conduction path and the fifth selectively engageable conduction path, to cause current to flow along the third conduction path and the seventh conduction path; and selectively engage the second selectively engageable conduction path and the sixth selectively engageable conduction path, to cause current to flow along the fourth conduction path and the eighth conduction path.

* * * * *